H. G. DORSEY.
DEVICE FOR APPLYING CHAINS TO WHEELS IN MOTION.
APPLICATION FILED JAN. 31, 1918.

1,399,700.

Patented Dec. 6, 1921.

INVENTOR
Herbert Grove Dorsey
BY Howson and Howson
ATTORNEYS

H. G. DORSEY.
DEVICE FOR APPLYING CHAINS TO WHEELS IN MOTION.
APPLICATION FILED JAN. 31, 1918.

1,399,700.

Patented Dec. 6, 1921.
9 SHEETS—SHEET 2.

INVENTOR
Herbert Grove Dorsey
By Howson and Howson
ATTORNEYS

H. G. DORSEY.
DEVICE FOR APPLYING CHAINS TO WHEELS IN MOTION.
APPLICATION FILED JAN. 31, 1918.

1,399,700.

Patented Dec. 6, 1921.

INVENTOR
Herbert Grove Dorsey
BY Horman and Horman
ATTORNEYS

H. G. DORSEY.
DEVICE FOR APPLYING CHAINS TO WHEELS IN MOTION.
APPLICATION FILED JAN. 31, 1918.

1,399,700.

Patented Dec. 6, 1921.
9 SHEETS—SHEET 5.

INVENTOR
Herbert Grove Dorsey
BY Horrmann and Horrmann, Attys

H. G. DORSEY.
DEVICE FOR APPLYING CHAINS TO WHEELS IN MOTION.
APPLICATION FILED JAN. 31, 1918.

1,399,700.

Patented Dec. 6, 1921.
9 SHEETS—SHEET 6.

INVENTOR
Herbert Grove Dorsey
BY Horsman and Strong
ATTORNEYS

H. G. DORSEY.
DEVICE FOR APPLYING CHAINS TO WHEELS IN MOTION.
APPLICATION FILED JAN. 31, 1918.

1,399,700.

Patented Dec. 6, 1921.
9 SHEETS—SHEET 9.

INVENTOR
Herbert Grove Dorsey
BY Harrison and Harrison
ATTYS

UNITED STATES PATENT OFFICE.

HERBERT GROVE DORSEY, OF GLOUCESTER, MASSACHUSETTS.

DEVICE FOR APPLYING CHAINS TO WHEELS IN MOTION.

1,399,700.            Specification of Letters Patent.        Patented Dec. 6, 1921.

Application filed January 31, 1918. Serial No. 214,739.

*To all whom it may concern:*

Be it known that I, HERBERT GROVE DORSEY, a citizen of the United States of America, residing at Gloucester, in the county of Essex and State of Massachusetts, have invented certain new and useful Improvements in a Device for Applying Chains to Wheels in Motion, of which the following is a specification.

My invention relates to a device for applying non-skid chains to automobile wheels and particularly to a device for applying the chain or chains while the wheels are in motion, the object of my invention being to provide a practical, working apparatus for this purpose.

Several embodiments of my invention are shown in the accompanying drawings, in which—

Fig. 9$^c$ is a broken edge view of said carrier;

Fig. 9$^e$ is a cross section through a detail of said plate;

Fig. 10$^a$ is an enlarged plan of the governor parts;

Fig. 11 is a broken plan of a modified chain end construction;

The problem of automatically applying non-skid chains to the wheels of an automobile while the latter is in motion, presents various phases, such as the support of the chain normally in an out-of-the-way position; the movement of the chain into position to be applied to the wheel; the ready detachment of the chain from its support; the application of the chain to the wheel; the locking of the chain ends together; the freeing of the chain from the various elements of the mechanism so that it is at liberty to creep around the wheel; the control of the mechanism so that it will not operate when the wheel is turning at excessive speed; and various problems of detail which permit of many solutions. Several variations are herein described and shown, and others will readily occur to those dealing with the problem.

Referring first to the construction shown in Figs. 1 to 12, the detailed description thereof may be prefaced by the statement that while chains of various types may be employed, I have shown only the commonest type, viz., one having continuous side holding chains 42 which lie in adjusted position on opposite sides of the tire 1 and are united at spaced intervals by cross chains 41, which stretch across the tire tread and form the ground-gripping element of the chain.

Figure 1:
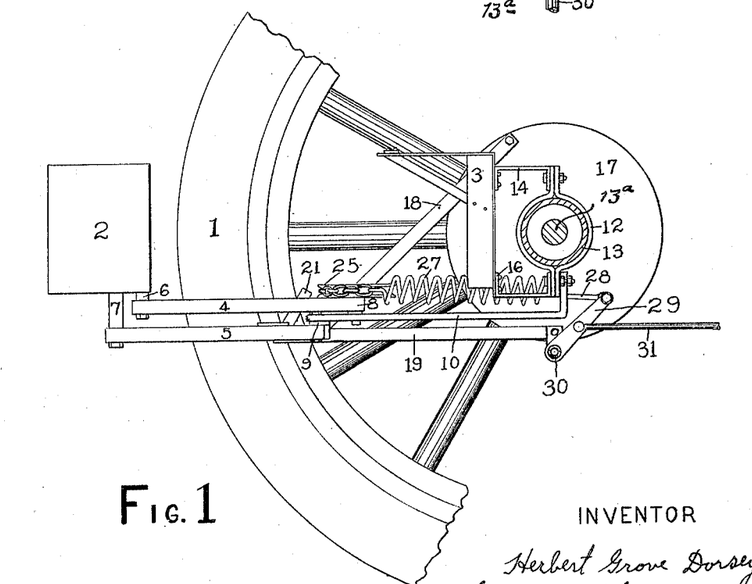
Figure 1 is a partial side elevation of the left-hand rear wheel of an automobile, showing mechanism for shifting a chain casing to position for the application of the chain to the wheel.
Figure 2:
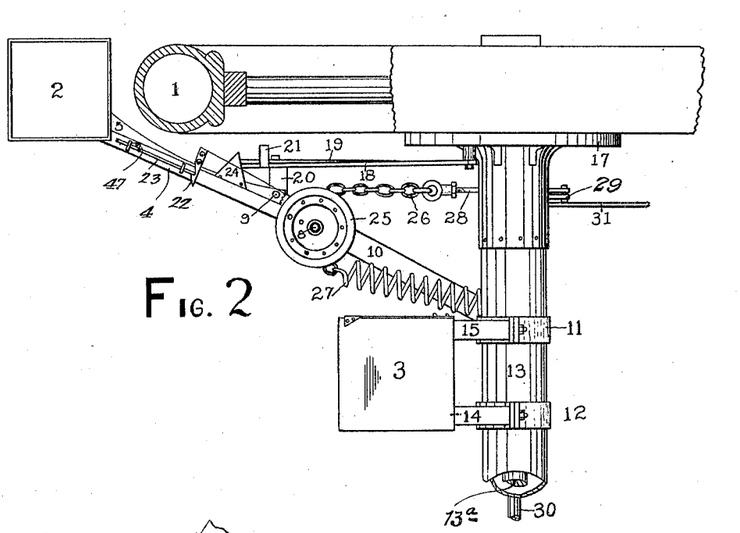
Fig. 2 is a plan thereof.

*The housing.*—While under certain conditions it might be feasible to provide a fixed support for the chain adjacent the periphery of the wheel, it is necessary in general to use a chain carrier which normally occupies an out-of-the-way position, and to provide associated means for shifting it to operating position when the chain is to be applied to the wheel rim. I have illustrated such a carrier in the present case as a box-like housing 2, open at the top and supported from beneath by arms 4 and 5 pivoted thereto at 6 and 7, respectively. The opposite ends of these arms are jointed at 8 and 9 to a horizonal frame member 10, so the box 2 may be swung to operating position (Figs. 1 to 4) from a normally out-of-the-way or home position beneath the shelter 3 (Figs. 1 and 2). This shelter 3 is carried by pairs of brackets 14, 15, and 16 clamped upon the casing 13 of the rear axle 13ᵃ of the car. The frame member 10 extends from this clamp 11 outward toward the wheel rim and is connected at its outer end by a strap 20 to the supporting bars 18 and 19 which converge on the latter from their points of attachment, respectively, to the upper and lower portions of the brake drum casing 17.

In order to shift the chain housing 2 from its shelter 3 to operative position, I secure to the lever arm 4 a chain wheel 25, the axis of which coincides with the pivot 8 and around which passes the chain 26. One end of the latter is attached to a return spring 27, secured to bracket 11, while the other end is attached to a link 28 jointed to the rocker arm 29, pivoted on the frame bar 19 and operated from any suitable point by the connecting rod 31. A rod or sleeve 30, fast with rocker arm 29 at its axis, extends across the car and engages another rock arm 29 to operate in unison the chain carrier for the wheel at the opposite end of shaft 13ᵃ. Obviously, the actuation of the rod 31 pulls the chain 26 and thus swings the housing arms 4 and 5 carrying the box 2 to position for the application of the chain to the wheel. The box is locked in this position during the chain applying operation, about to be described, by a latch 22 secured to the outer end of the frame member 10. Over the nose of this latch rides the near end of a locking bolt 23, mounted on the arm 4, and pressed by its spring 47 into latching engagement with said nose when the chain box has reached operative position.

*Chain carriers.*—The end of the chain first applied to the wheel may, for convenience, be termed the primary chain end, and the opposite end of the chain called the secondary chain end. These ends of the chain are carried, the primary by plate 38 and the secondary by arms 68, all pivotally mounted on the chain box 2. The primary end carrier plate 38, shown by itself in Fig. 9, comprises a metal sheet recessed along one edge at 38ᵃ to accommodate the periphery of the wheel, and thus forming two legs which straddle the wheel. At the ends of these legs are hinged fingers 63 with studs 63ᵃ adapted to engage the enlarged terminal links 43 at the primary end of the two side chains and so to support said links that the major portion thereof projects beyond the ends of the hinged fingers 63. At the opposite margin of the plate 38 are secured angles 88 through which pass the pins 39 by which the plate is pivoted to the brackets 40 on the chain box 2. In normal position this plate overlies the top of the box, and the chain is housed within the latter with the primary ends of the side chains suspended through their links 43, from the fingers 63, and the primary cross loop 41 engaged at intervals by spring clips 44 spaced along the margin of the recess 38ᵃ.

Figures 3, 4:
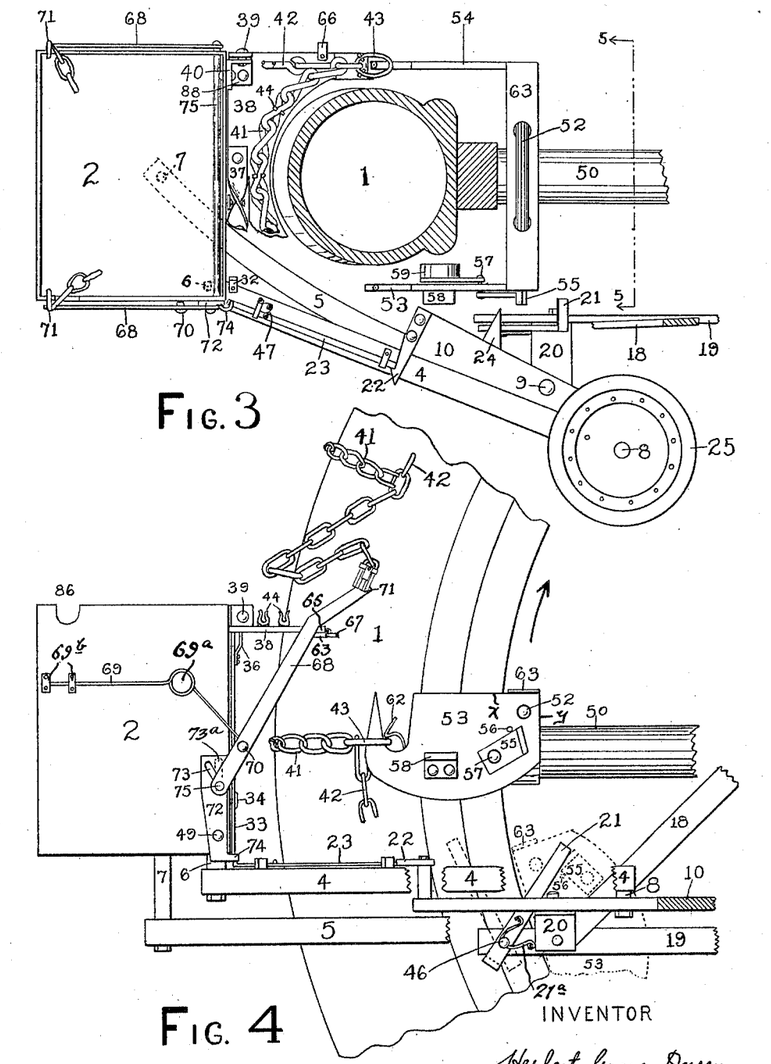
Figs. 3 and 4 are respectively a broken plan and broken side elevation of the chain applying mechanism, the latter being shown at different stages in the operation.
Figure 5:
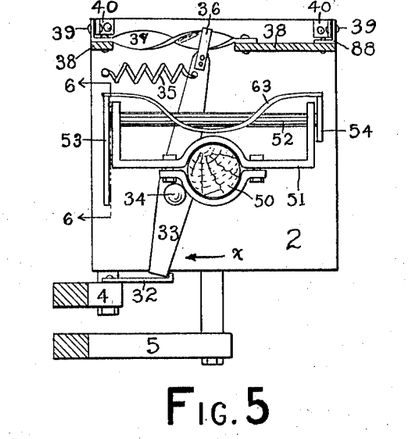
Fig. 5 is a view on the line 5—5, Fig. 3, but with the tire and rim omitted.
Figure 6:
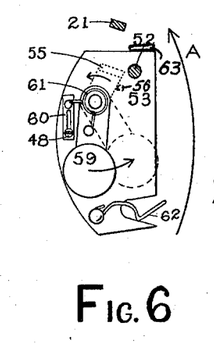
Fig. 6 is an elevation of the chain catch-hook viewed from the side thereof opposite that shown in Fig. 4.
Figure 7:
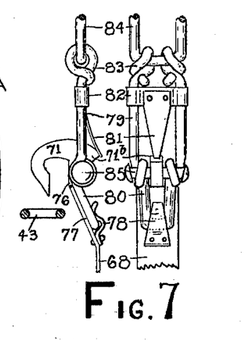
Fig. 7 shows in plan and side elevation, respectively, the snap hook at the secondary end of the chain.
Figure 8:
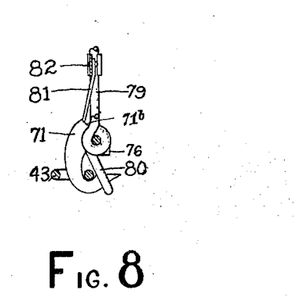
Fig. 8 is a side elevation of said hook in closed position.
Figure 9:
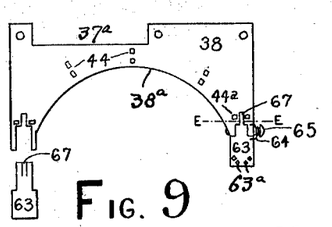
Fig. 9 is a face view of the primary carrier on which is supported the end of the chain primarily applied to the wheel; one end link support is shown detached and in blank form.
Figure 10:
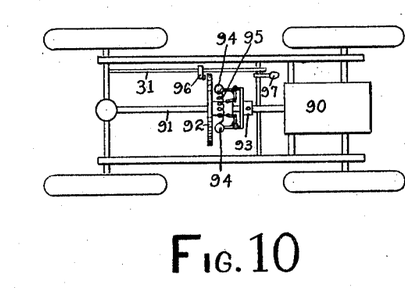
Fig. 10 is a plan of an automobile chassis showing a lever arrangement and governor therefor for operating the casing shift mechanism.
Figures 10A, 11:
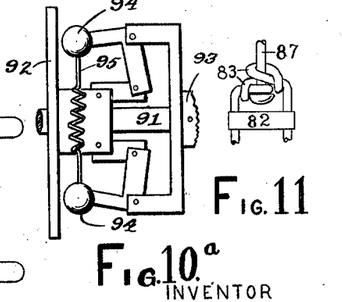

To rotate the plate 38 to its operative position shown in Figs. 3 and 4 there is mounted thereon, across the notch 37ᵃ (Fig. 9) cut out of the hinge end thereof a twisted flat strip forming a screw 37. Engaging this screw is a fork formed by the upper end of the lever 33 and the lug 36 riveted thereon. The lever 33 is pivoted on the box at 34 and a spring 35 pulls the forked arm of the lever (Fig. 5). When the box is in its inoperative position the forked arm of the lever 33 is pulled to its home position by spring 35, and the relation of the fork and screw is such that the plate 38 overlies the top of the box as previously described. The end of lever 33 opposite the fork extends below the bottom of the box 2. One of the box supporting arms 4, is provided with a hook 32, and as the box swings to its operative position the hook 32 describes around axis 6 as a center part of a circle which is tangent to the line *x* produced, Fig. 5, and in the direction of its arrow so that when the hook 32 engages the lower end of lever 33 the latter is rotated to the position shown, which will rotate screw 37 and consequently plate 38 to its operative position (shown in Fig. 3). Any other suitable means may be employed for this purpose, but the device shown is simple and inexpensive.

The secondary ends of the side chains are supported by a pair of levers 68, connected together by a spindle 75 which passes through and is journaled in the sides of the chain box 2. The levers 68 lie outside the box, and the end links 71 of the chain pass through notches 86, Fig. 4, into engagement therewith.

Compound springs 69 are made of spring wire, a portion of which is bent into a helix of one or more turns at 69ª. One end is pivotally mounted on the arms 68 at 70 and the other end is clamped under clamps 69ᵇ. Before mounting, the initial shape of the compound spring would be such that the end shown pivoted at 70 would be in a line from pivot 75 to the center of the loop 69ª, and the portion shown straight at numeral 69 would be curved, with a concavity toward the bottom of the box 2. When mounted under the clamps 69ᵇ, a stress is put on the concave portion, straightening it to the shape shown, and producing a stress on the loop 69ª in the direction of a line drawn from the center of this loop to the pivot 75.

Since there is a considerable portion of wire in the loop, the force necessary to move the end at the pivot 70 about the center of the loop is so slight in comparison to the force necessary to bend the portion between the clamps and the loop, it may be neglected in comparison with the latter and the action of the loop may be considered similar to a pivot. Thus, the resultant force of the spring is principally in the direction of a line drawn from the center of the loop 69ª to the pivot 75.

When the point of application, 70, of the spring force is to the right of line 69ª—75, arms 68 tend to be rotated clockwise, and when 70 is to the left the spring exerts a counter clockwise turning moment.

*Chain applying mechanism.*—In order to apply the chain to the wheel, I provide the latter with a pair of hook plates 53 and 54 lying on each side of the wheel rim and united by a spindle 52 journaled in the bracket 51 affixed to a spoke 50 or other suitable wheel element. A spring bar 63, mounted upon the spindle 52, bears at its ends upon the flat sides X or Y of the hook plates. When this spring bears upon the flat sides Y, it serves to retain the hooks in their normal inoperative position, indicated in dotted lines at the bottom of Fig. 4; while, when it bears on the flat sides X, it holds the hooks in their operative position, shown in full lines in said figure. In order to swing the hooks outward into operative position where they will engage the primary chain end links 43 supported by the outwardly swung carrier plate 38, I provide one of the hooks with a bracket 55 adapted to be engaged by a lever 21 pivoted at 46 on the frame bar 19 and normally taking the position indicated in dotted lines in Fig. 4, under the action of its return spring 21ª. As the box 2 moves toward its operative position, however, the V-shaped boss 24 on the box supporting arm 5 forces the lever 21 to take its operative position shown in full lines in Fig. 4. In this position, the end of the lever lies in the path of the hook bracket 55 and is engaged thereby as the wheel rotates, so that the hook 53 is swung outward on its axis 52 to operative position, where it is held by its spring 63 which now bears against the edge X thereof. The hook is now in position to engage the links 43 at the primary chain end and to draw the chain onto the wheel.

*Centrifugal safety device.*—Inasmuch as the impact of the hook 53 against the chain link 43 might be so severe as to rupture the latter or otherwise to cause derangement of the apparatus in case the chain were drawn out of the casing 2 at too high speed, as would be the case if the car were traveling rapidly—say, more than ten or fifteen miles an hour—I provide a centrifugal safety device which prevents the hook 53 from being moved into operative position while the car is moving too rapidly. This device comprises a weighted arm 59 (Figs. 3 and 6) fast with the pivot pin 57 which carries the bracket 55, and a counter spring 61 engaging the weighted arm 59 at one end and at its other end, a slide 60, by which the tension of the spring may be regulated through the adjustment of the clamping screw 48. If the car is traveling at a speed of, say, ten miles an hour, the centrifugal effort of the weighted lever 59 is counteracted by the spring 61; but where this speed is exceeded, the arm 59 swings on the pivot 57 and thus moves the bracket 55 out of the path of the actuating lever 21. Consequently, even though the chain box 2 may be moved to operative position when the car is traveling at excessively high speed, the chain will not be applied, since the hook 53 is not shifted to position to engage the chain link 43, but remains in the inoperative position shown in dotted lines in Fig. 4.

Obviously, this safety device is merely an optional arrangement to safeguard the apparatus from injury, and it may be dispensed with where thought advisable.

*Application of the chain.*—Assuming the hooks 53 to have been shifted to operative position, their tongues engage the links 43 at the first end of the chain, and the springs 62 hold the links against escape as the wheel revolves. During this revolution, the chain is drawn out of the box 2 and onto the circumference of the wheel. As the latter portion of the chain is drawn out of the box, the arms 68, which carry the secondary end of the chain, swing out under the pull of the chain and the accelerating action of their compound springs 69 until they are halted by the lugs 66 on the primary carrier 38. In this position they present the secondary end snap hooks to the primary links 43, and the latter are automatically engaged thereby. As here shown (Fig. 7), each of these snap hooks comprises a special link having an eye 77 gripped by a spring 78 at the end of the arm 68. The hook 71, pivoted at 85 on the link 79, is held open by end of arm 68 bearing against shoulder 76 in such position that it is free to enter the open link 43 at the primary end of the chain. As soon as the eye 77 is drawn away from the arm 68, by the upward pull of link 43 spring 81 throws the hook 71 through the link 43 and into the eye 77, thus locking the chain ends together. The spring 81 now bears against the inclined shoulder $71^b$ at the opposite end of the hook and prevents the latter from accidentally freeing itself from the link 43.

*Return movement.*—Simultaneously with this engagement of the chain ends, the secondary arms 68 are slightly drawn forward by the impact in the direction of the travel of the wheel before the link 77 is disengaged therefrom, and this motion is utilized to release the chain box bolt 23 through the latch plate 72 (Fig. 4). This plate is pivoted at 49 and has at one end a cam slot 73 in which the pivot pin 75 of the lever 68 is free to travel. Obviously, as the lever is drawn forward by the chain, the pin 75, working in the slot 73, slightly rotates the catch plate 72 and thereby frees the bolt 23 from the catch 22. Inasmuch as the lever system 4 and 5 is subject to the pull of the return spring 27 (Figs. 1 and 2), the chain box 2 is now swung back to its shelter 3 by the pull of this spring. As it returns, the lever 21 is freed from the V-boss 24 and takes up its normal position, under the action of its return spring $21^a$. As the wheel rotates, the stop 58 on the hook engages the short end of the lever 21, and the hook 53 is thereby disengaged from the chain link 43. This completely disengages the chain from the applying mechanism so that it is now free to creep around the circumference of the wheel in the customary manner which is essential to its proper functioning.

As the lug 32 (Fig. 5) is moved away from the lever 33 during this return motion of the box carrying arms 4 and 5, the lever 33 moves to the left, under the action of its return spring 35, thus rotating the spiral bar 37 and swinging the primary chain end carrier 38 to its normal position above the open top of the chain box 2. The secondary chain end arms are rotated counter clockwise by the plate 38 until the spring end 70 passes the line $69^a$—75, whereupon the spring 69 completes their return movement. The parts are now all back in their initial position, with the chain applied and free to creep around the wheel.

*Motor operated governor control.*—In the construction just described, I have indicated that the chain boxes for both wheels are simultaneously actuated by the sleeve 30 jointed to the rocker arms 29 at opposite ends of the axle and operated through the connecting rod 31. Inasmuch as the rod 31 would be positively moved by the driver of the car, reliance is placed wholly upon the weighted rock lever 59 to prevent the hook 53 from being moved into position when the car is traveling at excessive speed. I may dispense with this type of safety device and substitute a mechanism such as that illustrated more or less diagrammatically in Fig. 10. In this figure, the motor 90 rotates the main driving shaft 91. On this I have mounted a disk 92, the longitudinal position of which on the shaft is controlled by a governor, the sleeve 93 of which is keyed to the shaft 91 and carries the usual governor weights 94 and springs 95. The operating rod 31 for the chain boxes carries a stop 96 secured thereto in fixed position and at a predetermined point with relation to the disk 92. If the car is traveling at too high a speed, the position of the disk 92, under the influence of the governor, will be so close to the stop 96 that the rod 31 cannot be operatively shifted by pressure upon the pedal 97. Under ordinary circumstances, this will serve as a warning to the driver to slow down the car before attempting to apply the chains; but in emergencies, where the driver prefers to risk wrecking the chain mechanism and perhaps the back of his car, the rod 31 may be shifted by pressing upon the pedal hard enough to overcome the resistance of the governor. By quick action the driver could lock the wheels after the chain had been partially drawn on and thereby prevent serious accident.

Figure 12:
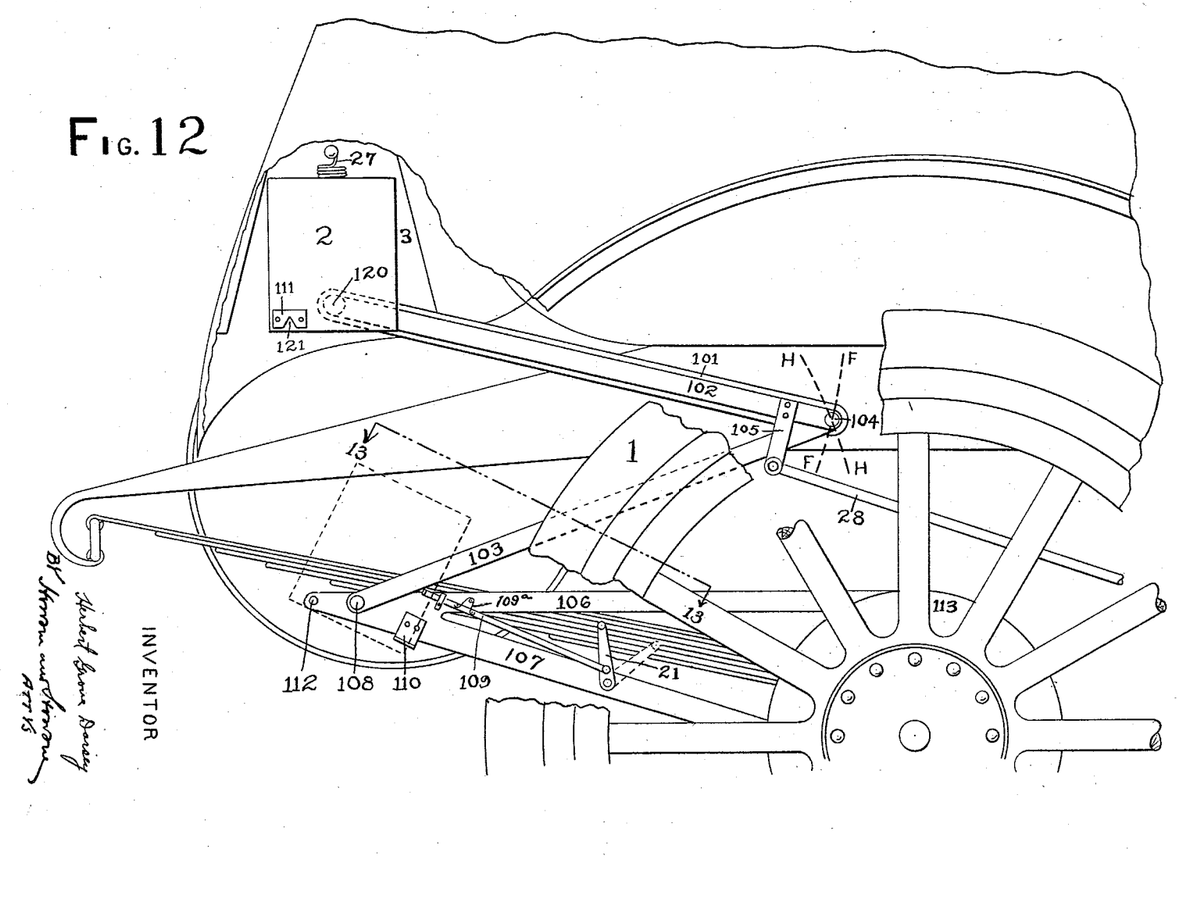
Fig. 12 is a broken side elevation of a rear wheel and mechanism for moving the chain carrier from its normal position to operating position for a modified method of chain application.
Figure 13:
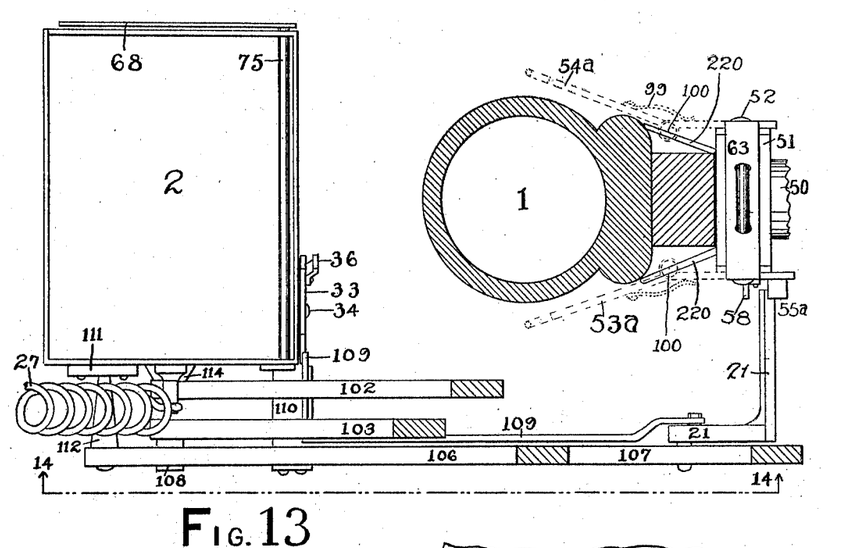
Fig. 13 is a section on the line 13—13, Fig. 12.
Figure 14:
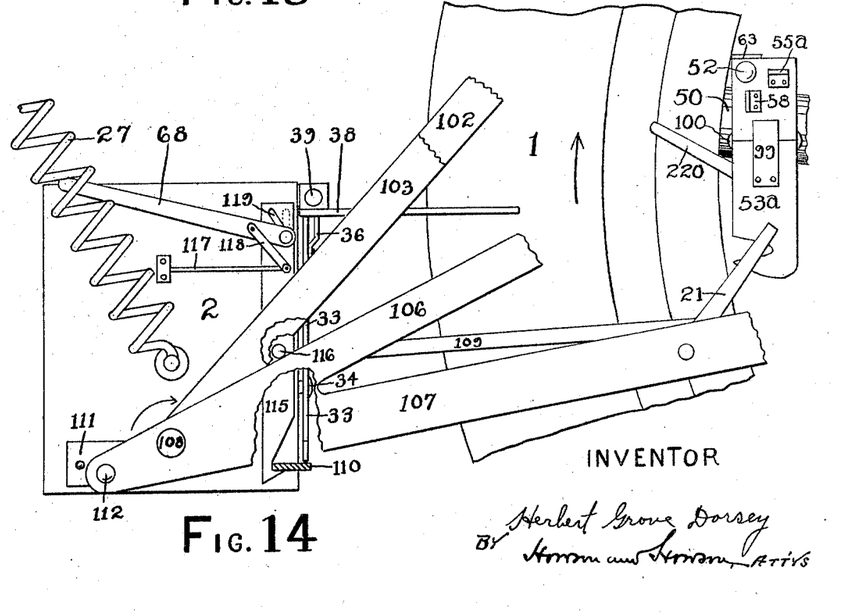
Fig. 14 is a broken side elevation on the line 14—14, Fig. 13.
Figure 15:
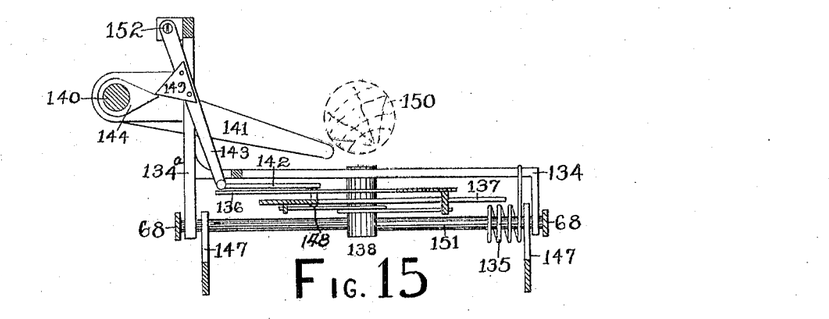
Figs. 15 to 20 show a modified mechanism for applying the chain to the wheel,— Fig. 15 being a section on the line 15—15— Fig. 16, Fig. 16 being a radial section through the wheel rim with the primary carrier in chain applying position, Figs. 17 and 18 being elevation and section, respectively, on the lines 17—17 and 18—18—Fig. 16, Fig. 19 being a section on the line 19—19—Fig. 17, and Fig. 20 being a plan of a detail.

*Modified chain box location.*—In most of the more expensive cars, as now constructed, there is too little room at the rear axle for such a location of the chain boxes as I have shown in the construction just described. A modified construction in which the chain box is located at a different point is indicated in Figs. 12, 13, and 14. Here the chain box 2 is normally supported within a shelter 3 formed in the top of the mudguard or a portion of the tonneau, and is suspended in this position by a spring 27. A bracket having two legs 106 and 107 is bolted to the brake drum 113 or other suitable support rigid with the chassis. To this bracket, at 108 is pivoted one of the blades, 103, of a shear-like mechanism, of which the other blade 101 is pivoted at 120 to a fixed point on the tonneau. Blades 101 and 103 are of equal length and on the axis of their common joint, 104, is pivoted the fulcrum of a lever, formed of bars 102 and 105 riveted together, the long arm, 102 being pivoted to box 2 on the stud 114, Fig. 13, and short arm 105 having a pivot connection to rod 28. When the tonneau oscillates on its springs, the pivot axis 104 will describe the arc F F relative to the tonneau, and the arc H H relative to the chassis, but bar 102 has the same length between its pivots as the blades 101 and 103 so that relative motion of the tonneau to the chassis will produce no effect on the position of box 2 about its axis on stud 114 (Fig. 13) and a tension on the forward end of rod 28 will produce a counter clockwise motion to the lever, lowering the box 2 to the operative position indicated in dotted lines in Fig. 12. As it reaches operative position, it is tilted by the engagement of pin 112 on bracket 106—107, which engages in a V-notch 121 in a bracket 111 secured to the side of the chain box 2. When thus supported, the car body may move up and down without affecting the location of the chain box with reference to the wheel.

As the chain box tilts on a line through pivot 108, the nose at the lower end of the latch 115, pivoted at 116 to the box, snaps over the angle 110 riveted to the frame bar 107, thus holding the box in fixed position during the chain applying operation. Simultaneously, the lower end of the lever 33, pivoted at 34 on the box, engages the angle 110, thus thrusting the other arm of the lever 33 to the right, Fig. 5, and through its forked end formed by the lug 36, operates the twisted plate 37 and thus rotates the primary chain end carrier 38, precisely as before. The arms 68 which carry the secondary end of the chain are pivoted higher up in the box than before and are subject to the pressure of spring 117 connected thereto by the link 118. The hook engaging lever 21 of the previous construction is here shown pivoted on the bar 107 and jointed to a connecting rod 109, the angled end of which lies in the path of the box as it tilts to operating position and is displaced to the right thereby until the lever 21 takes the position shown in dotted lines in Fig. 12. This arm is now properly located to operate the hooks 53ª and 54ª in precisely the same manner as previously described for the hooks 53 and 54, but with the following modification.

*Modified hook construction.*—In large automobiles there may be danger, on account of their greater weight, that the hooks will be injured if they are bumped against curbing, ruts, etc., and it is desirable for this reason to have the hooks of such construction that they normally lie within the plane of the wheel and thus out of reach of any projection which might possibly injure them. I have accomplished this by dividing and hinging the parts of the hooks on pivots 100, while the hooks as a whole are still rotatable as before around the axis 52 carried by the bracket 51. The springs 99 press against the parts of the hooks in such manner as to keep them flat when in inoperative position (Figs. 13 and 14), so that they do not project beyond the sides of the rim of the wheel. When, however, the lever 21 engages the bracket 55ª and the hooks are swung outward to operative position by turning on the axis 52, the outer hinged ends thereof slide along the guides 220, which are attached to the bracket 51, and are forced outward to the dotted position shown in Fig. 13. In Fig. 14 the chain box is illustrated as having been brought to operative position just in time for the angled end of lever 21 to escape the projection 55ª on hook 53ª so that the hooks will not be swung into operative position until the next revolution of the wheel.

After the secondary ends of the chains have been hooked to the primary ends, the cross rod 75 at the pivot ends of the secondary carrier arms 68 is pulled upward in a slot 73ª, indicated in dotted lines, in the sides of the box, and moves through the cam slot 119 in latch 115 to swing the latter sufficiently to release its nose from the angle 110. The chain box is thus freed and thereupon returns to its shelter 3, under the action of the spring 27. The primary and secondary chain end carriers 38 and 68 return to normal position as before. As the box 2 rises, the lever 21 is freed and returns, under the influence of its spring 109ª, to its normal position in which it will engage the stop 58 and rotate the hooks back to their home position, where they again straighten out under the action of springs 100, and hence are again out of the way of road obstructions.

It is, of course, evident that I could use this form of hook construction with or without the governor attachment previously described, and also that I could use it on a lighter car instead of the construction first described, if it were deemed preferable.

Figure 16:
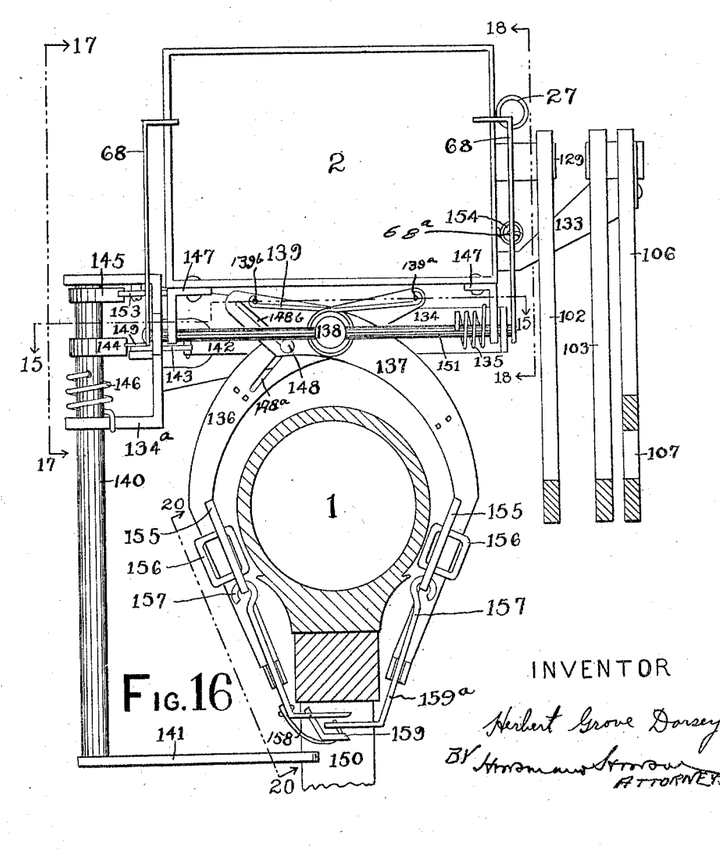
Figure 17:
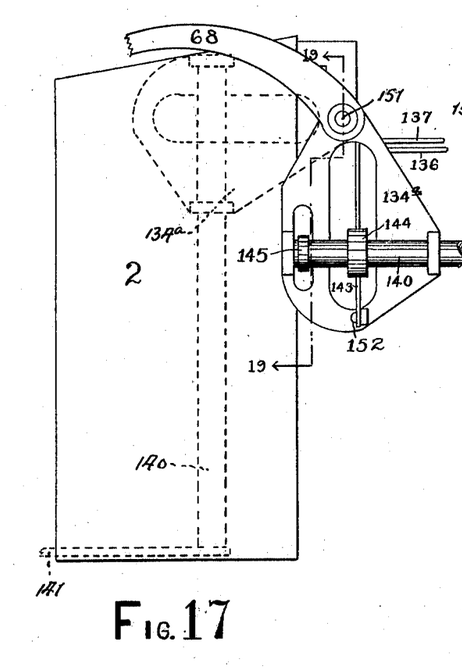

*Modified chain applying mechanism.*—In Figs. 15 to 20 I have shown a modified arrangement by which the chain may be applied to the wheel without mounting a draw-on hook upon the wheel itself. Inasmuch as this modification relates primarily to the chain applying device, I have not illustrated the method of bringing the chain box into operative position; but I have assumed that a mechanism may be used such as that illustrated in Fig. 12, in which the box is supported by a fixed bracket 106—107, swinging bracket 101—103, and operating lever 102, and this mounting is illustrated in Fig. 16.

In the present modification the chain applying mechanism is supported by brackets 147 secured to the box 2, in which is journaled the shaft 151. A frame 134 is pivoted on this shaft and carries, intermediate the brackets 147, a stud 138 which is pierced to permit the shaft to pass therethrough. Swinging on this stud are two curved lever arms 136—137 which support, at their free ends, the primary end of the chain. The levers 68, which carry the secondary end of the chain, are fast to the opposite ends of the shaft 151. For the sake of clarity, I have omitted the showing of the chain length from Fig. 16.

Considering first the levers 136—137, it will be noted that in Fig. 16 I have shown them embracing the tire 1 in the position which they assume when applying the primary chain end. Normally, they occupy a position nearly parallel with the front face of the chain box 2 and are held thereon by the spring 139 coiled on the stud 138 and having its ends engaged with pins 139$^a$ and 139$^b$ at the extended ends of the levers. The extent of angular motion of the levers is limited by a pin 148 sliding in slots 148$^a$ and 148$^b$ formed in the levers. The pin 148 is carried by a slide 142 jointed at its opposite end to a lever 143, which is pivoted at 152 to a lug on the head 134$^a$ rigid with the frame 134. A V-shaped stud 149 on this lever controls the operation of the primary chain and levers 136—137.

Figure 18:
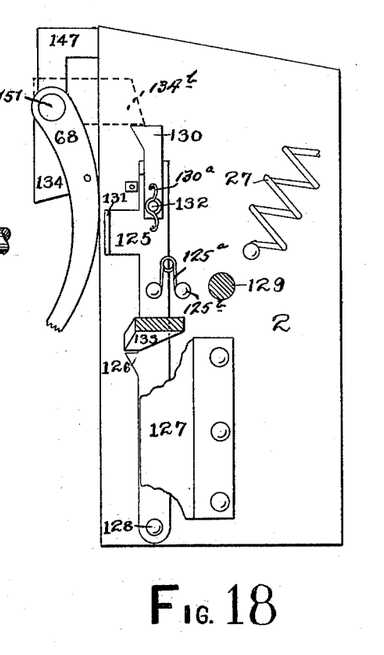
Figure 19:
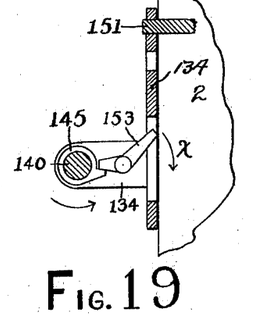
Figure 20:
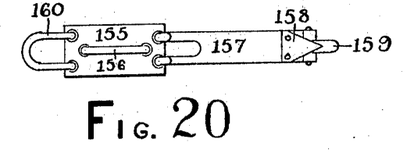

The secondary chain arms 68 are normally held in closed position by a coiled spring 154 (Fig. 16) which accelerates the final outward movement of these levers after its point of attachment, 68$^a$, Fig. 18, to the levers 68 has passed the axis of the shaft 151 in a manner similar to that previously described. Between the spindle 151 and the frame 134 a resilient connection is afforded by the spring 135 coiled upon the spindle and engaging the latter at one end and the frame with its other end. The spring 135 is merely diagrammatically shown, and its function will be hereinafter referred to.

Journaled in the head 134$^a$ of the frame is a rod 140 resiliently connected thereto by the spring 146 and carrying at one end a finger 141, adapted to be brought into the path of a spoke 150 of the wheel. Mounted on this shaft is a cam 144 coöperating with the angular lug 149 mounted on the lever 143, also a dog 145 coöperating with a bell-crank detent 153 (see Fig. 19). The detent 153 normally engages dog 145 and serves to hold the rod 140 in such position that the finger 141 is at right angles to the position illustrated in Fig. 16, and releases the rod, in a manner about to be described, only when the chain box has reached operative position and the chain is to be applied.

In its normal position, the frame 134 lies at right angles to the position shown in Fig. 16, with the spring 135 under tension. In this position, a wing 134$^b$ (Fig. 18) on the frame engages a stop 130, pivoted at 132 on the end of a lever 125, pivoted at 128 on the side of the box. As the levers 102—103 move downward to bring the chain box into operative position, a projection 133 (Figs. 16 and 18), carried by frame 106—107, slides upward along the edge of the lever 125 until it engages the cam nose 126 formed thereon, thus forcing the lever to the right and moving the detent 130 out of engaging position beneath the wing 134$^b$ of the frame. This releases the frame 134 and permits the latter to rotate about axis 151 to the position shown in Fig. 16. As the downward movement of the chain box is completed, the lug 133 rides over the cam nose 126 and takes a position above the latter, the lever 125 being returned to its original position by its spring 125$^a$, thus locking the box in its down position.

During the final travel of the chain box to operative position, the bell-crank detent 153 (Fig. 19), one arm of which normally engages the side of the box, escapes the margin of the latter and rotates clockwise, allowing the rod 140, under the pressure of its spring 146 to rotate counter clockwise and move the finger 141 into position to engage the spoke 150. When the finger is now engaged by the spoke, the rod 140 is rotated thereby, thus causing its cam 144 to displace the lever 143 through the wedge-shaped stud 149 on the lever. The motion thus imparted to the lever 143 shifts the slide 142 to the right, forcing the pin 148 through the slots 148$^a$ and 148$^b$ and thereby causing the arms 136—137 to swing into the position indicated in Fig. 16 in which they embrace the tire. The arms 136—137 carry at their free ends the primary chain end links 156, to which are attached interengaging latching elements 159—160 which automatically lock the chain end to the wheel. The chain is thereupon drawn out of the box by the wheel, and the secondary chain arms 68 eventually follow and apply their automatic hooks to the links 156 at the primary end of the chain, so that the entire chain is secured in position on the wheel and is free to travel thereon to an extent limited by the space between adjacent spokes 150.

When the finger 141 is engaged by the spoke 150, it is rotated a certain distance by the impact of the spoke, and it then continues to rotate under the action of its spring 146 until it is 180° from its first position. The spring 139 is now free to act upon the arms 136—137 and retracts the latter to their normal open position.

When the secondary chain end levers 68 are swung out, they tension the spring 135, and the latter thereupon returns the frame 134 to its original position in which it is locked by the catch 130, the latter yielding on its pivot 132 as the wing 134$^b$ engages the inclined nose of the latch and swings up to position above the latter, which is returned to its holding position by the spring 130$^a$. The chain box is still held in position, however, by the lug 133. In order to disengage the latter, I utilize the downward pull of the secondary chain end arms 68 under the influence of their springs 154. As these arms swing down, they impinge against a stop 131 on the lever 125 and force the latter to the right a sufficient distance to free the nose 126 from the stop 133; but this motion is limited by the stud 125$^b$, so that the detent 130 is not thereby disengaged from the wing 134$^b$. The box is now free to return to its home position, under the pull of the spring 27.

The application of the chain is now complete, and the parts return to their normal position. After the emergency has passed which necessitated the application of the chain, the driver may stop the car and detach the strap 157 and thereby give the chain complete freedom to creep around the tire. The latching element carried by the strap 157 may be of any suitable type, and I have shown merely an illustrative construction. The snap hook shown is carried by a plate 155 having a rectangular link 156 and also a link 160 to which the side chains are connected. The locking spring 158 yields as the strap 159$^a$ presses the hook 159 open and immediately returns the latter into engagement with the link in well understood manner. As in the construction first described, the latching hooks for the secondary chain end may be of any suitable type, the construction shown being merely illustrative.

Figure 21:
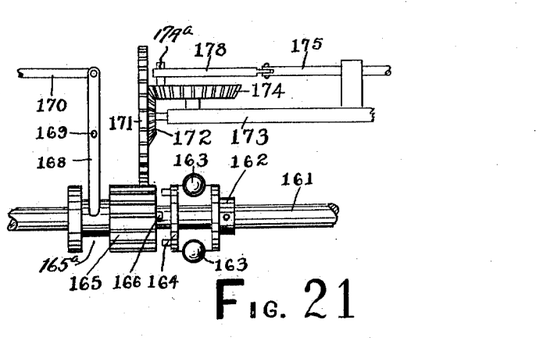
Fig. 21 is a plan illustrating a method of operating the chain carrier by power derived from the automobile itself.
Figures 22, 23:
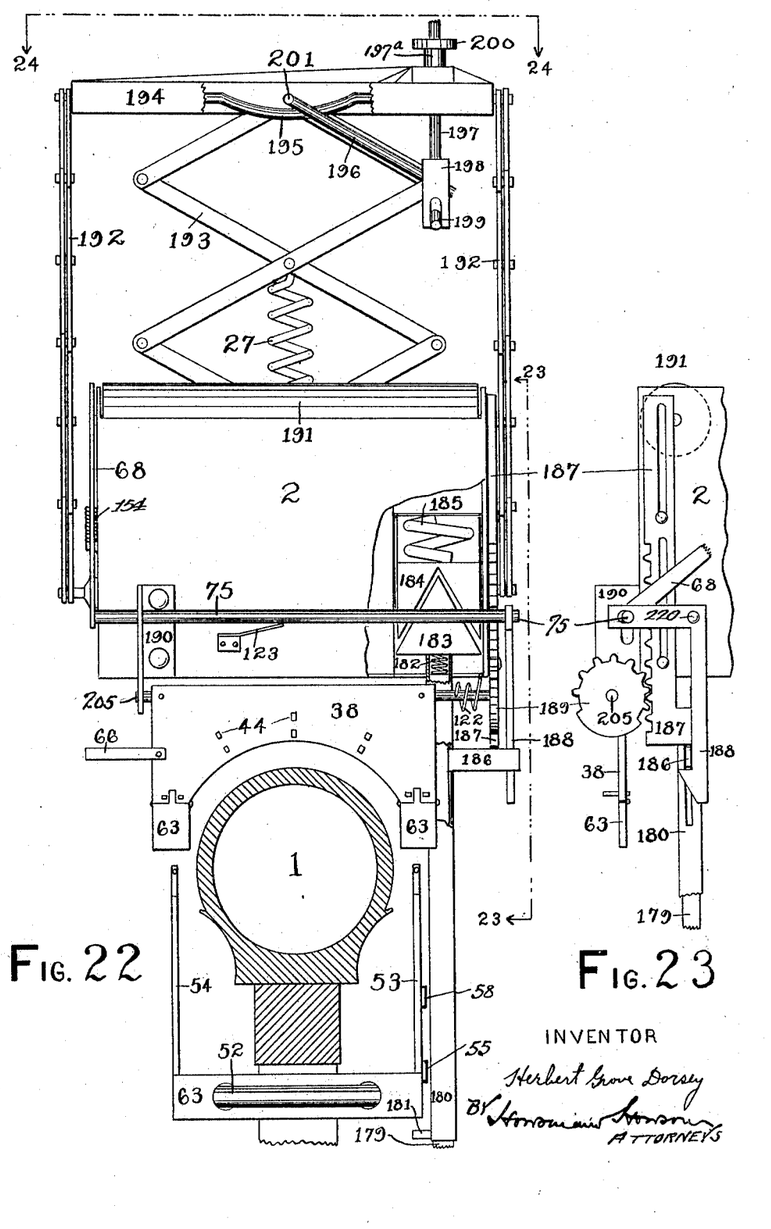
Figs. 22 to 26 illustrate an arrangement for applying the chain to a front wheel of an automobile,—Fig. 22 being a broken front elevation showing the mechanism in operating position, Fig. 23 being a side elevation of portion thereof on the line 23—23, Fig. 22, Fig. 24 being a plan of the casing support, Fig. 25 being a more or less diagrammatic side elevation and Fig. 26 being a similar broken front elevation of the chain carrier, indicating the location thereof with respect to the wheel axle and showing particularly the device for imparting angularity to the chain carrier corresponding to that of the wheel.
Figure 24:
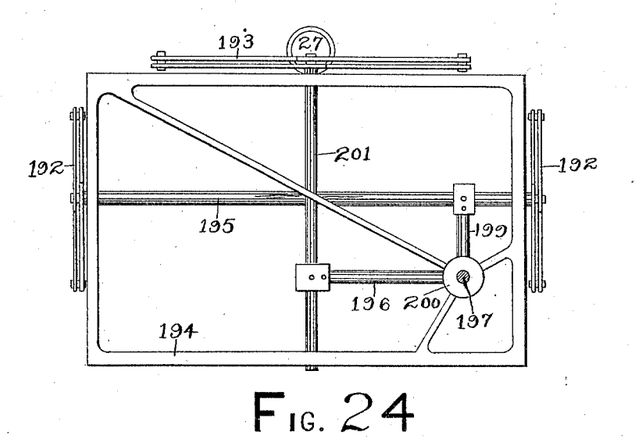
Figure 25:
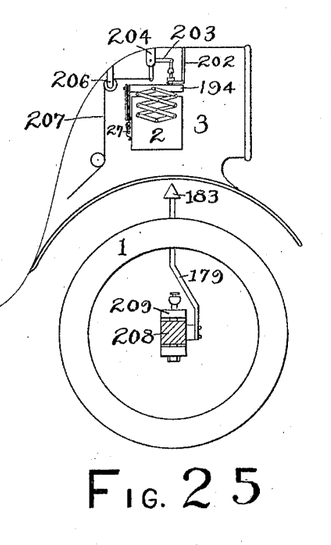
Figure 26:
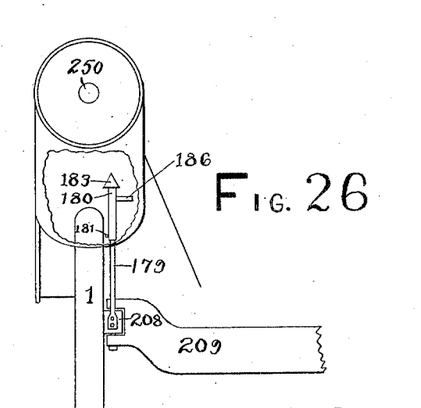

*Power shift of chain carriers.*—Inasmuch as the chain boxes are moved to operating position against the action of return springs, it may involve considerable effort to accomplish this by foot power alone, and I have therefore indicated in Fig. 21 an arrangement by which the shift of the chain box may be accomplished by the driving motor. The driving shaft 161 is here shown provided with a gear 165 mounted freely thereon and having on one face a clutch pin 166 and at the opposite end a collar 165$^a$. Facing the clutch end of the gear is a coöperating clutch member 164 connected through the governor 163 to a collar 162 pinned to the shaft. The driver's control rod 170 is jointed to a fork 168 pivoted at 169 and engaging the collar 165$^a$ of the gear 165. Meshing with the latter is a gear 171, rigid with a bevel gear 172, which meshes with a coöperating bevel gear 174 carried by bracket 173. Bevel gear 174 has teeth on only one-half of its circumference and hence it can be rotated only one-half revolution by gear 172—that is to say, sufficiently to bring it to operating position. A crank pin 174$^a$ on bevel gear 174 is engaged by the link 178, pivoted to the operating rod 175, which communicates motion to the chain boxes. The radial distance from the axis of gear 174 to the pin 174$^a$ is such that a half turn of gear 174 thus brings the chain box to operative position. Just as in the construction indicated in Fig. 10, by which the governor controls the actuation of the chain box operating rod, so in the present construction the governor 163 controls the actuation of the operating rod 175, since the clutch element 164 is moved out of range of the clutch pin 166 when the driving shaft 161 is rotating at too high a speed. The shaft 161 might equally well be one of the wheel axles instead of the driving shaft.

*Chain box arrangement for front wheels.*—In Figs. 22 to 26 inclusive I have indicated an arrangement for the chain box for the front wheels of the car. It is obvious that some arrangement must be made by which the chain boxes can be made to follow the angle at which the wheels are turned at the moment at which it is desired to apply the chains. In the construction illustrated I have shown the chain box housing 3 formed as part of the front wheel mudguards, and this housing may also be used as a housing for the headlights 250. Directly over each wheel axis, I support, by bracket 202, a frame 194 provided with a collar 200 on the stem 197$^a$, so that the frame is free to swivel on a vertical line passing through the wheel knuckle joint. The chain box 2 is suspended from the frame 194 by three pairs of lazytongs 192—193, which insure the vertical movement of the box during its raising and lowering operations. The box is held up by the coil spring 27 connected at one end to the box and at the other end to the rear lazytongs. The several pairs of lazytongs are interconnected at the frame 194 by rods, 195, 196, 197, 199, and 201 and the slotted piece 198, through which pass the rods 196 and 199 at right angles to each other. When the cord or chain 207 is pulled by the operating foot lever, it actuates the bell-crank 203, to which one end of the chain 207 is attached, and pushes down on the rod 197 which passes through the collar 200. This forces the rods 196 and 199 down, and the lazytongs are thus opened, forcing the chain box down into position above the wheel. In order to hold the chain box in operative position, a latch 188 is pivoted on the chain box at 220, and its nose engages beneath the finger 186 when the box is in its operative position.

In order to twist the box so that its position accurately coincides with the wheel when the latter is at an angle to the chassis, I mount on the wheel knuckle a squared rod 179 having a sleeve 180 which terminates at its upper end in a pyramidal projection 183. The latter fits into a correspondingly shaped recess in the block 184 which slides in guides within the chain box and is held thereby against rotation, so that the engagement of the projection 183 in the recess in the block 184 causes the chain box to take an angular position corresponding to that of the wheel. Inasmuch as there may be some mud in the socket piece 184 or on the angular cap 183, I prefer to afford some opportunity for the parts to yield with relation to their respective carriers, and for this purpose I have indicated the socket piece 184 slidable in guides against the action of the spring 185.

When the sleeve 180 is pushed down against the action of the spring 182 which rests on top of the rod 179, a pin 181 on the sleeve moves to such position that it engages the bracket 55 of the hooks 53—54 carried by the wheel and rotates the latter into operative position, as described with relation to the construction shown in Figs. 1 to 11. The rod 179 has the finger 186 projecting through a slot in sleeve 180 which engages the lower end of a rack 187 slidably mounted on the chain box. With this rack meshes a pinion 189 on shaft 205 to which the primary chain end carrier 38 is rigidly attached. The position of the finger 186 and rack 187 is such that as the chain box approaches the wheel, the rack is displaced and the carrier 38 thus swung into position in which the primary chain ends may be engaged by the hooks 53—54. In its normal position the carrier plate 38 is in a nearly vertical plane in front of the chain box 2.

To facilitate the running out of the chain from the chain box, I provide a roller 191 over which the length of the chain passes as it feeds onto the wheel. The secondary end of the chain is carried by the arms 68 which are fast with the ends of the shaft 75 which passes through vertical slots in the brackets 190. The flat spring 123 normally presses this shaft up to the top of the slots, and the secondary chain end arms 68 are also provided with springs 154, which either hold them in closed position or accelerate their final travel toward the wheel during the chain applying operation. When the secondary chain end hooks are pulled from the spring fingers at the ends of the carrying arms 68, the shaft 75 is jerked downward in the slots in the bracket 190 and frees the latch 188 from the finger 186, so that the chain box is now free to return to its home position. The shaft 205 returns to its normal position, under the influence of its spring 122, while the projection 66 on the primary carrier 38 returns the secondary carriers 68 to their home position, in a manner substantially similar to that previously described in connection with Figs. 1 to 12. The spring 182 bearing against the cap 183 now pushes the sleeve 180 upward, so that the pin 181 is raised to the position where it will engage the stop 58 on the hook 53 (seen in side elevation in Fig. 4), thus disengaging the hooks 53—54 from the links 43 at the next revolution of the wheel, leaving the chains free to creep around the wheels, as previously described.

It will thus be seen that the mechanism which I have provided is capable of applying the chains not only to the rear wheels, but also to the front wheels, or to either pair alone, or to one alone, as may be desired; furthermore, that the mechanism for operating the chain boxes may either be manually operated or power operated in various ways; and that the operation in either manner may be automatically controlled by a governor associated with the moving parts of the vehicle. It is also clear that the mechanism described affords means for attaching the chain to the wheel in such manner that the chain is released after its ends have been secured together, and is thus free to travel around the wheel. It is also seen that the mechanism for accomplishing these results is normally held in an out-of-the-way position, and is temporarily moved to operating position during the application of the chain and then automatically returned to its out-of-the-way position. The operation of the mechanism is rapid, so that the application of the chain and its release from the applying mechanism takes place within two revolutions of the wheel.

I claim:—

1. Mechanism for applying a non-skid chain to a wheel in motion, which comprises means for applying the primary chain end to the wheel so that the latter pulls the chain length onto the periphery of the wheel as the latter rotates, together with means to prevent operation under predetermined speed conditions.

2. The combination with mechanism for applying a non-skid chain to a wheel in motion, of centrifugally operated means for preventing the application of the chain during predetermined speed conditions.

3. Mechanism for applying a non-skid chain to a wheel in motion, which comprises a chain support normally located in an out-of-the-way position, and means for shifting said support to operative position adjacent the wheel during the application of the chain, together with a primary chain end carrier mounted on said support, and means automatically moving said carrier toward the wheel periphery as said support reaches chain applying position.

4. Mechanism for applying a non-skid chain to a wheel in motion, which comprises a draw-on hook mounted on the wheel adjacent its periphery, means for holding said hook normally in inoperative position, and means for moving it into operative position, together with a primary chain end carrier serving to present the primary chain end to the hook when the latter is in operative position.

5. Mechanism for applying a non-skid chain to a wheel in motion, which comprises a draw-on hook mounted on the wheel adjacent its periphery, means for holding said hook normally in inoperative position within the plane of the wheel, and means for moving its outer chain engaging end into operative position, together with a primary chain end carrier serving to present the primary chain end to the hook when the latter is in operative position.

6. In mechanism for applying a non-skid chain to a wheel in motion, primary and secondary chain end carriers, and means for moving the primary carrier into operative position in advance of the secondary carrier so that they operate in sequence as the wheel rotates.

7. The combination with a carriage, of a tire chain removably carried thereby, a ground wheel, and means on the chain and wheel coöperating to transfer the chain from the carriage to the wheel and retain the chain on the wheel, and a latch for connecting the ends of the chain when the same is positioned in the wheel, together with means to prevent the functioning of said coöperating means for excessive speed conditions.

8. In combination, a vehicle, a ground wheel, a hook mounted on the said wheel and means carried by the said vehicle to cause the said hook to change its position with reference to the said wheel.

9. In combination, a wheel, a hook mounted thereon, means to cause the said hook to change its position with reference to the said wheel, and means rendering said hook-positioning means inoperative when said wheel has attained a predetermined angular velocity.

10. Means for applying a non-skid device to a wheel in motion, combined with means to render said applying means inoperative during predetermined speed conditions.

11. The combination with a vehicle having a steerable wheel and a non-steerable wheel, of means for applying a non-skid device to the said steerable wheel while in motion irrespective of the alinement of said steerable wheel with the said non-steerable wheel.

12. The combination of a steerable wheel with a non-skid applying device, a guide keeping the course of the said wheel, and coöperative means between the said device and the said guide to cause the said device to take the course of the said wheel on the operation of the said device.

13. The combination of a vehicle, a steerable wheel, and a non-skid applying means for the said wheel when in motion, the said means being operable under all usual orientations of said wheel.

14. In combination, a movable vehicle having a body and a chassis, an elastic connection between the said body and the said chassis, a non-skid applying device normally carried on the said body, and means for transferring the said device to the said chassis for the operation of the said device.

In testimony whereof I have signed my name to this specification.

HERBERT GROVE DORSEY.